(12) United States Patent
Jackson, II et al.

(10) Patent No.: US 7,340,861 B2
(45) Date of Patent: Mar. 11, 2008

(54) INTEGRATED LAMINATED GLASS ATTACHMENT PLATE

(75) Inventors: Michael Jackson, II, Oxford, MI (US); Jonathan Price, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 662 days.

(21) Appl. No.: 10/740,017

(22) Filed: Dec. 18, 2003

(65) Prior Publication Data

US 2005/0144862 A1 Jul. 7, 2005

(51) Int. Cl.
*B60J 1/16* (2006.01)

(52) U.S. Cl. .................................... 49/375

(58) Field of Classification Search ............. 52/204.62; 296/96.11, 96, 96.21; 49/375; 156/106, 156/107; 428/137, 192, 203
See application file for complete search history.

(56) References Cited

U.S. PATENT DOCUMENTS

| | | | | |
|---|---|---|---|---|
| 3,919,022 | A | * | 11/1975 | Stefanik ..................... 156/104 |
| 3,953,630 | A | * | 4/1976 | Roberts et al. ................ 428/38 |
| 4,758,039 | A | * | 7/1988 | Ohhazama et al. ....... 296/96.21 |
| 4,991,351 | A | * | 2/1991 | Bertolini ....................... 49/351 |
| 5,120,584 | A | * | 6/1992 | Ohlenforst et al. ........... 428/34 |
| 5,515,651 | A | | 5/1996 | Hofmann et al. |
| 5,537,783 | A | | 7/1996 | Kazino et al. |
| 5,692,273 | A | | 12/1997 | Rodde |
| 5,966,872 | A | | 10/1999 | Wasek et al. |
| 6,330,764 | B1 | * | 12/2001 | Klosterman ................... 49/375 |
| 6,519,898 | B2 | | 2/2003 | Tatsumi et al. |
| 6,588,152 | B2 | | 7/2003 | Cabbane |

* cited by examiner

*Primary Examiner*—Richard E. Chilcot, Jr.
*Assistant Examiner*—Adriana Figueroa
(74) *Attorney, Agent, or Firm*—Ralph E. Smith

(57) ABSTRACT

A laminated automobile side glass includes an insert for engaging the window opening mechanism. The insert is molded for integration into the lamination layers, with a mechanism interface section, having a maximum thickness equal to the overall thickness of the glass. This mechanism interface section is arranged in a cutout of the window, so that the window presents a substantially continuous sheet without protrusions. The insert is formed to constitute substantially the entire engagement of the window with the opening mechanism, and to absorb the stresses imposed by vibration, opening and closing of the window, and the slamming of the automobile door.

13 Claims, 2 Drawing Sheets

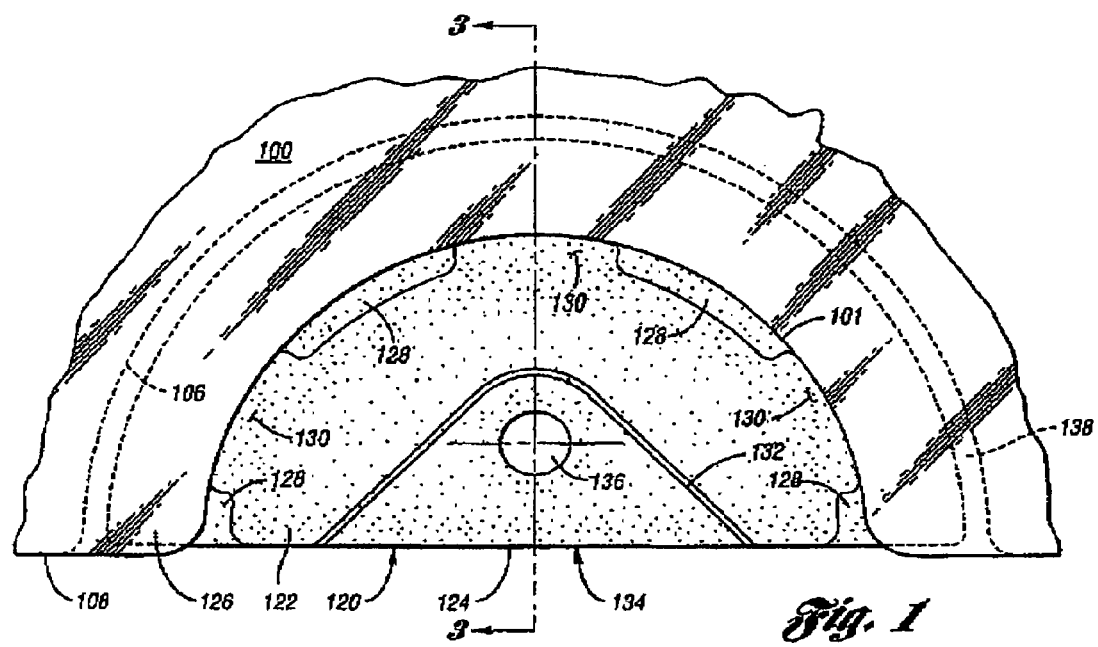
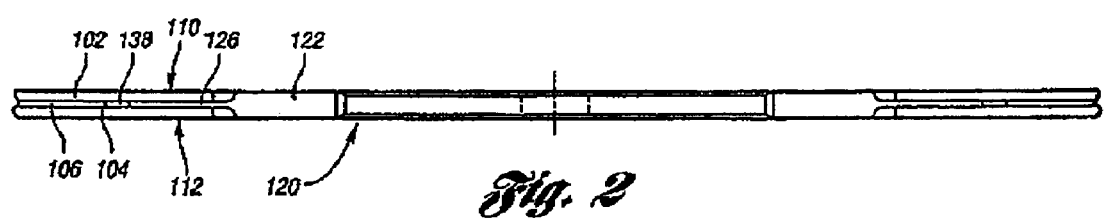

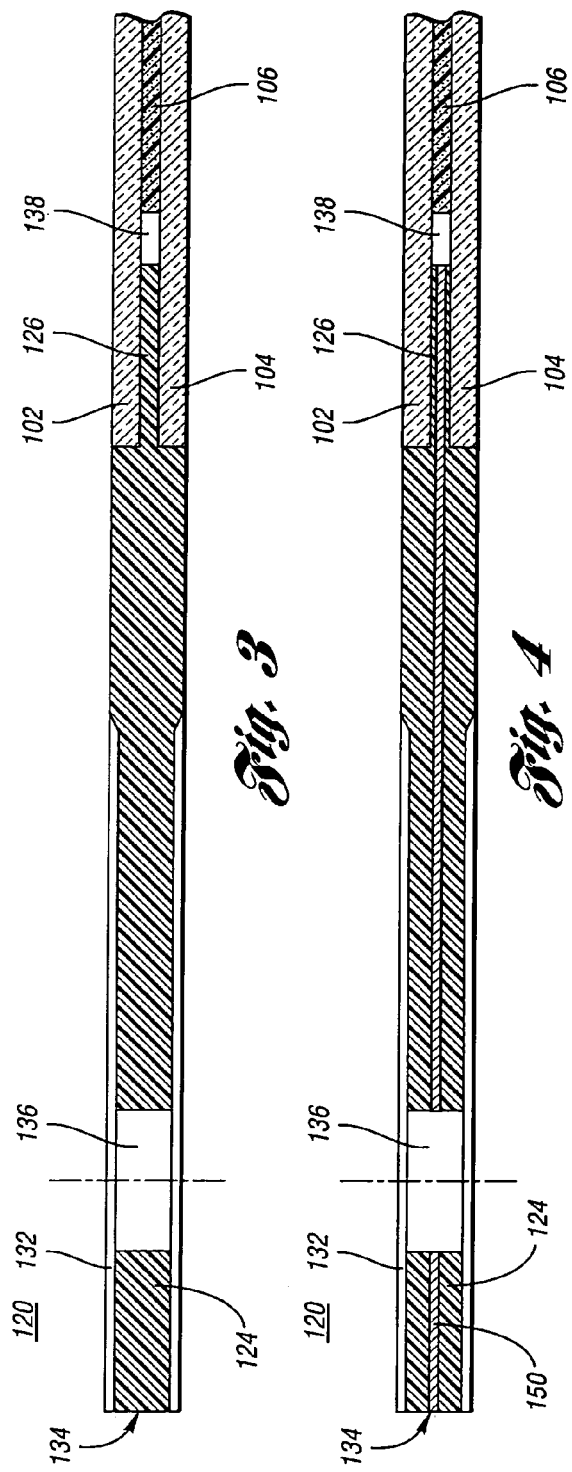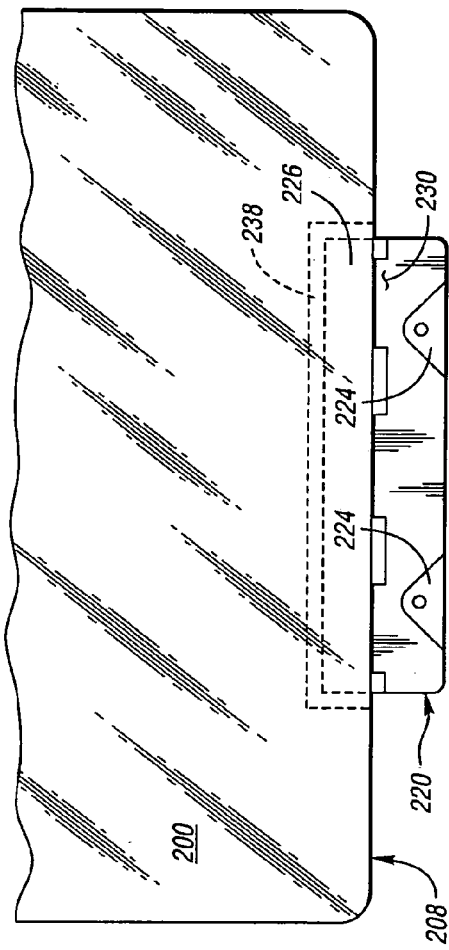

INTEGRATED LAMINATED GLASS ATTACHMENT PLATE

BACKGROUND OF THE INVENTION

1. Field of the Invention

The invention relates to an automobile window and a system for mounting the window to an opening mechanism.

2. Description of Related Art

Automobile windows that are capable of being opened are well known. It is common for the window glass to be attached to an opening mechanism operable by a hand crank or an electric motor. This attachment has generally been accomplished by a clamping of the lower edge of the glass by a mechanical clamp comprising part of the opening mechanism. In another method, a mounting plate is adhered to the surface of the window glass and the opening mechanism engages the mounting plate.

These methods have disadvantages which include unmanageable stresses imposed on the window glass, and inefficient shipment, handling and installation of the glass. The mounting point adhered to the surface of the glass requires bulky packaging, and spacing of window panes from one another to avoid contact with a protruding adjacent mounting point.

It would be advantageous to develop a mounting system for a moveable window glass that reduces or sufficiently distributes the stress on the window glass, and that provides for the window glass to be efficiently packed, transported to a vehicle assembly point, and incorporated in the vehicle assembly.

BRIEF SUMMARY OF THE INVENTION

A laminated window for a window opening mechanism comprises a first glass layer, a second glass layer bonded to the first glass layer by an adhesive, the adhesive defining a spacing between the first and second glass layers, and an engagement module having a portion adapted for bonding in the spacing between the first and second glass layers, the engagement module adapted to connect the window to the window opening mechanism.

BRIEF DESCRIPTION OF THE SEVERAL VIEWS OF THE DRAWINGS

The present invention will become more fully understood from the detailed description and the accompanying drawings, wherein:

FIG. 1 is an elevational view of a laminated side glass attachment plate according to the invention.

FIG. 2 is an edge view of the laminated side glass attachment plate of FIG. 1.

FIG. 3 is a cross-sectional view taken through line 3-3 of FIG. 1.

FIG. 4 is a cross-sectional view taken along line 3-3 of FIG. 1 illustrating a further embodiment of the invention.

FIG. 5 is an elevational view of a laminated side glass attachment plate according to a further embodiment of the invention.

DETAILED DESCRIPTION OF THE INVENTION

Referring to FIG. 1, a portion of a window 100 is illustrated, having a cut-out 101. The window 100 is formed from first and second glass layers 102, 104, and an internal adhesive layer 106 (see FIG. 2). First and second glass layers 102, 104 have first and second glass surfaces 110, 112 respectively. The adhesive layer 106 performs the function of binding the glass layers 102, 104 together and of reinforcing the window 100. An example of a material for the adhesive layer 106 is polyvinyl butyral (PVB).

The cut-out 101 is illustrated in FIG. 1 as semi-circular and positioned at an edge 108 of the window 100. The cut-out 101 comprises a portion of the window 100 void of glass 102, 104 and adhesive 106. An air gap 138 surrounds cut-out 101 between the first and second glass layers. This air gap 138 is also devoid of adhesive 106.

A semi-circular engagement module or attachment plate 120 is shown in FIGS. 1-4. The plate 120 is generally configured to reside closely within cut-out 101 to positively engage window 100, and includes a border 126 having a thickness approximately equal to that of the adhesive layer 106. In this manner, as shown in FIGS. 2-4, border 126 can be inserted into the air gap 138 between the first and second glass layers 102, 104 while maintaining a uniform thickness of the window 100. A portion of air gap 138 surrounds the border 126 between plate 120 and adhesive 106. A second adhesive (not shown) compatible with the material of plate 120 secures the border 126 of plate 120 between glass layers 102, 104.

Plate 120 further includes a main body 122 and a central hub 124 inwardly from border 126. Main body 122 is substantially of the same thickness as window 100 and includes a perimetric series of abutments 130 separated by indentations 128. The abutments 130 are generally of the same thickness as the window 100, while the indentations 128 are generally the same thickness as border 126, or are cut-outs, to provide relief between plate 120 and window 100. The abutments 130 are configured about main body 122 to bear against cut-out 101 of window 100.

The central hub 124 is generally thinner than the main body 122, and is joined to the main body 122 by chamfered edge 132. Central hub 124 further includes an aperture 136 through plate 120, generally perpendicular to the plane of window 100 and plate 120. The construction of plate 120 is anticipated to be of one of a number of plastic or composite materials.

Generally, the material selected should have good cold temperature (−30 to −40° C.) performance for shock and impact loads as well as good strength for heat stability (80-90° C.). In a vehicle door window, for example, the plate 120 may need to absorb the energy of a door slamming shut at ten feet per second, in order that this energy is not imparted on the window 100, thus breaking it.

Possible materials for the plate 120 include nylon (glass/mineral filled 30-60%), polyethylene terephthalate (PET, glass/mineral filled 30-60%), Acetal®, Delrin®, Grivory® or other materials with similar properties. The insert material and adhesive used must be compatible.

Referring to FIG. 4, it is anticipated that plate 120 might require more strength than is available from the composite material alone. A metallic insert 150, formed of steel or aluminum, is integrally molded into plate 120. In one example, the metallic insert 150 is on the order of 0.5 mm thick, and the plastic is injection molded onto the insert 150 to obtain the needed strength and maintain compatibility with the window 100.

The plate 120 is bonded to the window 100 by the adhesive (not shown) applied between border 126 and glass layers 162, 104. The adhesive bears any loads in tension between plate 120 and window 100. In compression, the load between plate 120 and window 100 is spread across abutments 130.

Window 100 is installed in a window opening mechanism (not shown) by sliding the plate 120 into a receiving clamp, sleeve or slot of the window opening mechanism. Proper insertion is aided by the reduced thickness of the central hub 124 relative to the surrounding main body 122. As lower edge 134 of plate 120 is directed into the opening mechanism, the wedge shape of the central hub 124 will align with a corresponding portion of the opening mechanism. This corresponding portion of the opening mechanism has a narrower slot configured for positive alignment with the thinner central hub 124 for insertion of the plate 120. For example, the slot could be configured with a wedge to match the illustrated central hub 124.

The opening mechanism further includes a detent or catch (not shown) in the slot for positively engaging aperture 136. For the purpose of engagement by the detent or catch, a recess in the plate 120 may be substituted for aperture 136 without adversely affecting its function. As the window 100 is mounted into the opening mechanism, the corresponding portion of the opening mechanism guides the detent to positively engage aperture 136 to lock the window 100 onto the opening mechanism. The window opening mechanism may be further provided with a clamping feature for compressing onto the central hub 124 or onto a portion of main body 122 adjacent to or surrounding central hub 124. All forces from the opening mechanism for opening and closing the window 100 are thus routed through the plate 120. Any shock energy, including lateral shock caused by slamming a door or vertical shock encountered while driving, is also absorbed by the plate 120.

A further embodiment of a plate 220 is shown in FIG. 5. The window 200 includes a straight lower edge 208, and plate 220 includes a border section 226 inserted into the gap 238 between the laminations of the window 200 proximate the lower edge 208. The plate 220 includes at least one hub 224 for the window opening mechanism, similar to the first embodiment. The plate 220 further includes a number of abutting regions 230 for asserting a force against the lower edge 208 of the window 200.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A laminated window for a window opening mechanism, comprising:
   a first glass layer;
   a second glass layer bonded to the first glass layer by an adhesive such that an air gap is formed that defines a space between the first and second glass layers; and
   an engagement module having a portion received within at least a portion of the air gap to bond the engagement module between the first and second glass layers, the engagement module connecting the window to the window opening mechanism;
   wherein the engagement module comprises a border that is received between the first and second glass layers to bond the engagement module to the first and second glass layers and a central hub adapted to engage the window opening mechanism.

2. The window of claim 1, wherein the adhesive is polyvinyl butyral.

3. The window of claim 1, wherein the central hub defines a wedge-shaped portion for aligning with the window opening mechanism.

4. The window of claim 3, wherein the central hub comprises an aperture for lockingly engaging the window opening mechanism.

5. The window of claim 1, wherein the central hub comprises an aperture for lockingly engaging the window opening mechanism.

6. The window of claim 1, wherein the engagement module is bonded to a lower edge of the window for vertical movement of the window by the window opening mechanism.

7. The window of claim 6, wherein the lower edge defines an indentation for receiving the engagement module, the engagement module forming a continuation of the lower edge.

8. The window of claim 7, wherein the engagement module comprises a border for bonding between the first and second glass layers and a central hub adapted to engage the window opening mechanism.

9. The window of claim 7, wherein the indentation is semi-circular.

10. The window of claim 1, wherein the window has an edge, and the first and second glass layers define an indentation in the edge, the engagement module being received in the indentation.

11. The window of claim 10, wherein the indentation is semi-circular.

12. The window of claim 1, wherein the engagement module is formed of a material selected from the group consisting of nylon and polyethylene terephthalate.

13. The window of claim 12, wherein the engagement module further comprises an integrally molded metallic center.

* * * * *